United States Patent
Birru

(10) Patent No.: US 7,218,672 B2
(45) Date of Patent: May 15, 2007

(54) APPARATUS AND METHOD FOR CONSTRAINING THE VALUE OF FEEDBACK FILTER TAP COEFFICIENTS IN A DECISION FEEDBACK EQUALIZER

(75) Inventor: Dagnachew Birru, Yorktown Heights, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 882 days.

(21) Appl. No.: 09/978,991

(22) Filed: Oct. 16, 2001

(65) Prior Publication Data

US 2003/0099289 A1    May 29, 2003

(51) Int. Cl.
    H03H 7/30    (2006.01)
(52) U.S. Cl. ..................................... 375/233
(58) Field of Classification Search ............... 375/233, 375/232; 333/28 R, 138, 144; 708/322, 708/323
    See application file for complete search history.

(56) References Cited

U.S. PATENT DOCUMENTS 3,646,480 A * 2/1972 Spaulding .................... 333/18
4,422,175 A * 12/1983 Bingham et al. ........... 375/232
5,572,552 A * 11/1996 Dent et al. .................. 375/343
6,570,919 B1 * 5/2003 Lee ............................. 375/233
6,804,695 B1 * 10/2004 Hsu ............................ 708/322
6,850,559 B1 * 2/2005 Driessen et al. ............ 375/219
6,865,239 B1 * 3/2005 Gonikberg .................. 375/350

FOREIGN PATENT DOCUMENTS

| DE | 3605325 A1 | 8/1987 |
| EP | 0143214 A2 | 6/1985 |
| WO | 0113516 A2 | 2/2001 |

OTHER PUBLICATIONS

Trellis-Coded Modulation With Redundant Signal Sets-Part I Introduction, By G. Ungerboeck, IEEE Communications, Feb. 1987, vol. 25, No. 2, pp. 5-21.

* cited by examiner

*Primary Examiner*—Kevin Kim
(74) *Attorney, Agent, or Firm*—Larry Liberchuk

(57) ABSTRACT

An apparatus and method is disclosed for reducing error propagation in a decision feedback equalizer by constraining the values of feedback filter tap coefficients in a feedback filter of the decision feedback equalizer. The feedback filter tap coefficients that are constrained are calculated using a constraint cost function and a related constraint function. The constraint condition of the present invention reduces error propagation in a decision feedback equalizer by preventing error from circulating in a feedback loop of a feedback filter within the decision feedback equalizer.

20 Claims, 6 Drawing Sheets

US 7,218,672 B2

APPARATUS AND METHOD FOR CONSTRAINING THE VALUE OF FEEDBACK FILTER TAP COEFFICIENTS IN A DECISION FEEDBACK EQUALIZER

TECHNICAL FIELD OF THE INVENTION

The present invention is directed, in general, to decision feedback equalizers in digital communication devices and, more specifically, to an apparatus and method for constraining the valve of feedback filter tap coefficients in a decision feedback equalizer to reduce error propagation.

BACKGROUND OF THE INVENTION

The Digital High Definition Television (HDTV) Grand Alliance (Grand Alliance) is a group of television manufacturing and research organization in the television industry. After years of cooperative effort the Grand Alliance developed and proposed a standard for digital HDTV systems. The Grand Alliance standard has been adopted (with a few changes) by the Federal Communication Commission (FCC) as an official broadcasting standard for HDTV. The standard is known as the Advanced Television Systems Committee Digital Television Standard (the "ATSC Standard").

The ATSC Standard for HDTV transmission over terrestrial broadcast channels uses a signal that consists of a sequence of twelve (12) independent time-multiplexed trellis-coded data streams modulated as an eight (8) level vestigial sideband (VSB) symbol stream with a rate of 10.76 MHz. This signal is converted to a six (6) MHz frequency band that corresponds to a standard VHF or UHF terrestrial television channel, over which the signal is then broadcast.

The ATSC Standard calls for two (2) bit data symbols of the HDTV signal to be trellis encoded in accordance with an eight (8) level (i.e., a three (3) bit) one dimensional constellation. One bit of each data symbol is pre-coded, and the other is subjected to a ½ encoding rate that produces two coded bits in accordance with a four (4) state trellis code. For purposes of interleaving, twelve (12) identical encoders and pre-coders operate successively on every twelve successive data symbols. Symbols 0, 12, 24, 36, . . . are encoded as one series. Symbols 1, 13, 25, 37, . . . as a second series. Symbols 2, 14, 26, 38, . . . as a third series. And so on for a total of twelve (12) series. Therefore, the ATSC Standard requires twelve (12) trellis decoders in the HDTV receiver for the twelve (12) series of time division interleaved data symbols in the signal. Each trellis decoder in the HDTV receiver decodes every twelfth (12th) data symbol in the stream of coded data symbols.

In an ATSC Standard receiver trellis decoders are used to retrieve the original digital data that was trellis encoded just before being converted to 8-VSB symbols, modulated and broadcast. The use of trellis coding provides an improvement in the signal to noise ratio of the received signal, and the time multiplexing of twelve (12) independent streams reduces the possibility of co-channel interference from an analog NTSC broadcast signal residing on the same frequency. The abbreviation NTSC stands for National Television Standards Committee.

Each of the trellis decoders for the four (4) state trellis code operates in accordance with the well-known Viterbi decoding algorithm. Each of the decoders comprises a branch metric generator unit, an add-compare-select unit, and a path-memory unit. See, for example, "Trellis-coded Modulation With Redundant Signal Set, Part I, Introduction; Part II, State of the Art," by G. Ungerboeck, IEEE Communications Magazine, Vol. 25, pp. 5–21, February 1987.

In addition to being corrupted by noise, the transmitted signal is also subject to deterministic channel distortions and distortions caused by multipath interference. Consequently, an adaptive channel equalizer is generally used in front of the trellis decoders to compensate for these effects. The goal is to create a symbol stream that resembles, as much as possible, the symbol stream that was created by the twelve (12) trellis encoders at the transmitter.

One commonly used equalizer architecture makes use of a second equalizer known as a decision feedback equalizer (DFE). In this architecture, a conventional, or forward equalizer (FE) is supplemented by a DFE. The input to the DFE is an estimate of the original transmitted value of the current output symbol of the complete equalizer (FE and DFE). The output of the decision feedback equalizer (DFE) is subsequently added to the output of the forward equalizer (FE) to generate the output symbol. In a typical implementation, this estimate of the output symbol is obtained by simply "slicing" the equalizer output. The term "slicing" refers to the process of taking the allowed symbol value (of the eight (8) levels specified by the 8-VSB ATSC Standard) that is nearest to that of the actual output. Using the "sliced" symbols in a decision feedback equalizer (DFE) gives a near optimum error rate performance with low complexity. This approach, however, can suffer from error propagation caused by slicing errors. Because the typical symbol error rate after the equalizer for the HDTV signal can be up to twenty percent (20%), this can be a serious problem if the number of DFE filter taps is large.

After the equalizer, the HDTV signal is decoded in a trellis decoder that uses the Viterbi algorithm to decode the symbol stream based on the ½ rate trellis coding performed in the transmitter. As previously mentioned, the ATSC Standard specifies that twelve (12) trellis encoders and decoders are used in parallel in a time multiplexed fashion. Trellis decoding is then followed by byte de-interleaving and Reed Solomon decoding to further correct transmission errors in the signal.

A decision feedback equalizer (DFE) generally comprises a forward linear filter and a feedback filter inside a feedback loop. The feedback loop comprises a decision device (e.g., a slicer) and an error calculation unit. When errors are made by the decision device, the errors circulate in the feedback loop causing performance loss. The circulation of errors in the feedback loop is referred to as error propagation.

When the magnitude of the feedback filter taps is large, the effect of the error propagation often increases. This is because the error is multiplied by a large constant, thereby causing a greater error propagation. The resulting error continues to circulate in the feedback loop of the DFE, sometimes endlessly.

The filter tap coefficients of the DFE may be updated by using various prior art algorithms that exist for computing filter tap coefficients for adaptive equalizers. One commonly used method uses the well known least mean square (LMS) algorithm. The LMS algorithm is a successive approximation technique that uses the current coefficient and data tap values as well as the calculated error to compute the new coefficient value. The LMS algorithm repeats the procedure until each filter tap coefficient converges to the desired optimum value.

In a typical LMS algorithm the coefficient vector $f_n^{k+1}$ for the forward linear filter of a DFE is determined using the following formula:

$$f_n^{k+1} = f_n^k + \mu e_k r_{k-n}$$

where $$f_n^k$$

is a forward filter tap coefficient at time k, μ is an adaptation speed constant, $e_k$ is an error term, and $r_{k-n}$ is a value of the forward filter tap data in the forward filter at time k. The error term $e_k$ is the error calculated from the output of the DFE. The error term $e_k$ can be calculated in a decision directed fashion using a known training sequence embedded in the data stream. Alternatively, the error term $e_k$ can be calculated in a blind fashion using a Constant Modulus Algorithm (CMA) or a Decision Directed (DD) algorithm.

Similarly, the coefficient vector $$g_n^{k+1}$$

for the feedback filter of a DFE is determined using the following formula:

$$g_n^{k+1} = g_n^k + \mu e_k a_{k-n}$$

where $$g_n^k$$

is a feedback filter tap coefficient at time k, μ is an adaptation speed constant, $e_k$ is an error term, and $a_{k-n}$ is a value of the feedback filter tap data in the feedback filter at time k.

In a typical LMS algorithm the coefficients $$f_n^k$$

and $$g_n^k$$

are unconstrained. That is, the coefficients $$f_n^k$$

and $$g_n^k$$

can assume any value to reduce multipath interference effects in the DFE. For severe post-echoes and pre-echoes the value of the feedback filter tap coefficients $$g_n^k$$

can grow to such an extent that they reduce the performance of the DFE through error propagation.

There is therefore a need in the art for an apparatus and method that is capable of constraining the value of feedback filter tap coefficients $$g_n^k$$

in a decision feedback equalizer in order to reduce error propagation.

SUMMARY OF THE INVENTION

To address the deficiencies of the prior art mentioned above, the apparatus and method of the present invention reduce error propagation in a decision feedback equalizer by constraining the values of feedback filter tap coefficients in a feedback filter of the decision feedback equalizer.

The present invention constrains the values of the feedback filter tap coefficients by calculating updated coefficient values using a constraint cost function and a related constraint function. A coefficient adaptation unit within each filter tap cell of the feedback filter calculates the updated coefficient values.

It is an object of the present invention to prevent error propagation in a decision feedback equalizer.

It is another object of the present invention to prevent error from circulating within a feedback loop of a decision feedback equalizer.

It is still another object of the present invention to provide an apparatus and method for calculating values of feedback filter tap coefficients in a feedback filter of a decision feedback equalizer by applying a constraint condition to the values of the feedback filter tap coefficients.

It is also an object of the present invention to provide an apparatus and method for calculating values of feedback filter tap coefficients in a feedback filter of a decision feedback equalizer by applying a constraint condition to the values of the feedback filter tap coefficients where the constraint condition limits the total energy of the feedback filter tap coefficients.

It is another object of the present invention to provide an apparatus and method for calculating values of feedback filter tap coefficients in a feedback filter of a decision feedback equalizer by applying a constraint condition to the values of the feedback filter tap coefficients where the constraint condition limits the magnitude of each feedback filter tap coefficient to a threshold constant.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the Detailed Description of the Invention, it may be advantageous to set forth definitions of certain words and phrases used throughout this patent document: the terms "include" and "comprise" and derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller," "processor," or "apparatus" means any device, system or part thereof that controls at least one operation, such a device may be implemented in hardware, firmware or software, or some combination of at least two of the same. It should be noted that the functionality associated with any particular controller may be centralized or distributed, whether locally or remotely. In particular, a controller may comprise one or more data processors, and associated input/output devices and memory, that execute one or more application programs and/or an operating system program. Definitions for certain words and phrases are provided throughout this patent document. Those of ordinary skill in the art should understand that in many, if not most instances, such definitions apply to prior uses, as well as future uses, of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 7, discussed below, and the various embodiments used to describe the principles of the present invention in this patent document are by way of illustration only and should not be construed in any way to limit the scope of the invention. The present invention for constraining the value of feedback filter tap coefficients in a decision feedback equalizer in order to reduce error propagation may be used in any system that employs a decision feedback equalizer.

In the description of the exemplary embodiment that follows, the present invention is integrated into, or is used in connection with, a decision feedback equalizer within a digital television receiver. The present invention is not limited to use in a digital television system. Those skilled in the art will recognize that the exemplary embodiment of the present invention may easily be modified for use in any type of digital receiver system that uses a decision feedback equalizer including, without limitation, digital television systems, set top boxes, digital storage devices, digital radio systems, and any type of digital system that utilizes a decision feedback equalizer. The term "digital receiver system" is used to refer to these types of equipment.

Figure 1:
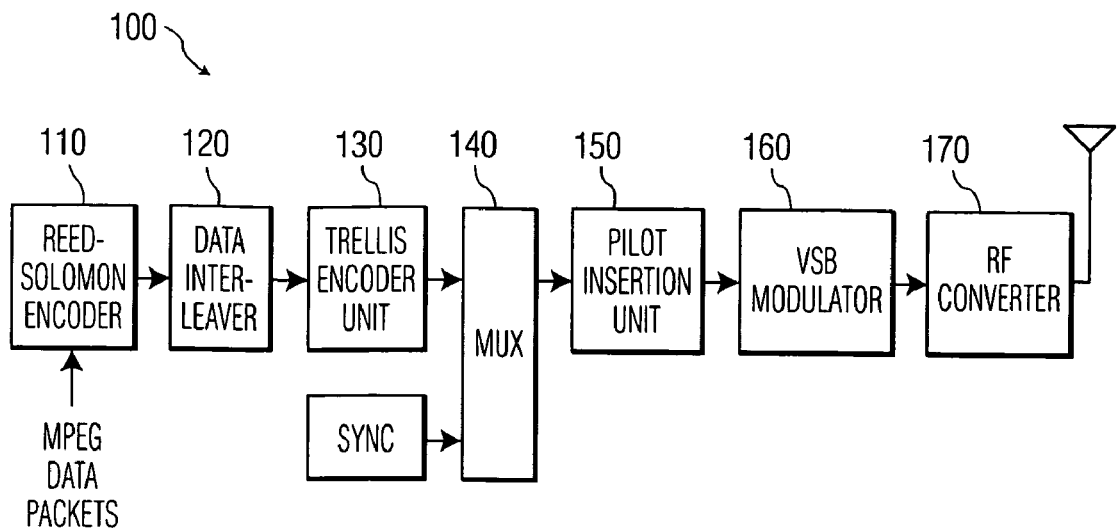
FIG. 1 illustrates a block diagram of an exemplary prior art high definition television (HDTV) transmitter.

FIG. 1 illustrates a block diagram of an exemplary prior art high definition television (HDTV) transmitter 100. MPEG compatible data packets are encoded for forward error correction (FEC) by a Reed Solomon (RS) encoder 110. The data packets in successive segments of each data field are then interleaved by data interleaver 120, and the interleaved data packets are then further interleaved and encoded by trellis encoder unit 130. Trellis encoder unit 130 produces a stream of data symbols representing three (3) bits for each symbol. One of the three bits is pre-coded and the other two bits are produced by a four (4) state trellis encoding.

Trellis encoder unit 130 comprises twelve (12) parallel trellis encoder and pre-coder units to provide twelve interleaved coded data sequences. The encoded three (3) bits of each trellis encoder and pre-coder unit are combined with field and segment synchronization bit sequences in multiplexer 140. A pilot signal is inserted by pilot insertion unit 150. The data stream is then subjected to vestigial sideband (VSB) suppressed carrier eight (8) level modulation by VSB modulator 160. The data stream is then finally up-converted to a radio frequency by radio frequency (RF) by converter 170.

Figure 2:
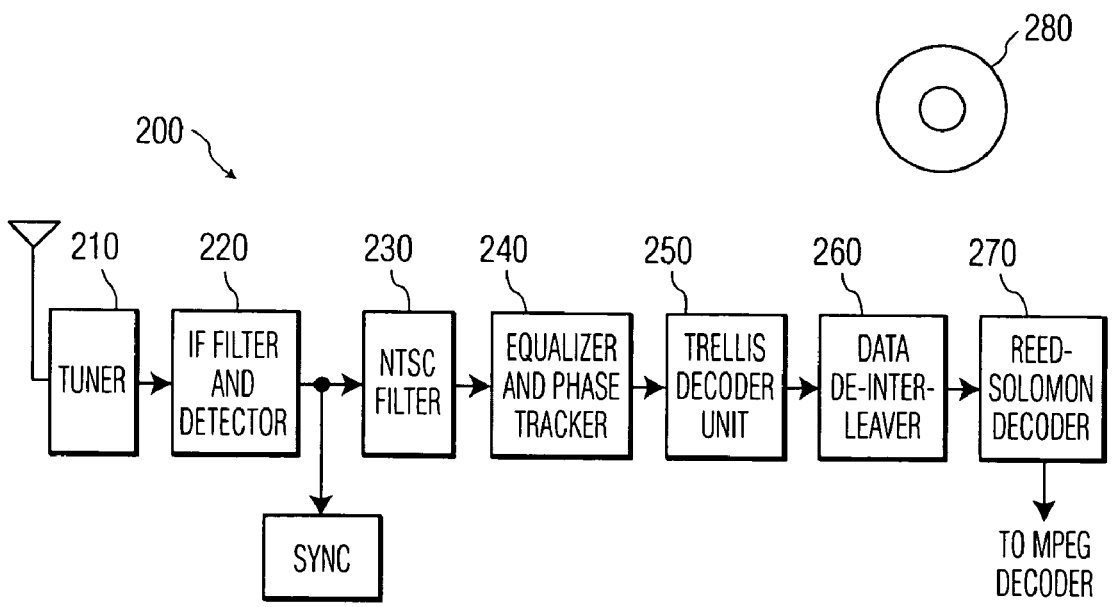
FIG. 2 illustrates a block diagram of an exemplary prior art high definition television (HDTV) receiver.

FIG. 2 illustrates a block diagram of an exemplary prior art high definition television (HDTV) receiver 200. The received RF signal is down-converted to an intermediate frequency (IF) by tuner 210. The signal is then filtered and converted to digital form by IF filter and detector 220. The detected signal is then in the form of a stream of data symbols that each signify a level in an eight (8) level constellation. The signal is then filtered by NTSC rejection filter 230 and subjected to equalization and phase tracking by equalizer and phase tracker unit 240. The recovered encoded data symbols are then subjected to trellis decoding by trellis decoder unit 250. The decoded data symbols are then further de-interleaved by data de-interleaver 260. The data symbols are then subjected to Reed-Solomon decoding by Reed Solomon decoder 270. This recovers the MPEG compatible data packets transmitted by transmitter 100.

A schematic representation of computer diskette 280 is also shown in FIG. 2. In an alternate advantageous embodiment of the present invention, computer diskette 280 may be inserted into a computer disk drive (not shown) in television receiver 200. The computer disk drive is capable of receiving information that relates to the values of feedback filter tap coefficients in a decision feedback equalizer within television receiver 200 and is capable of writing the information to computer diskette 280. In another alternate advantageous embodiment of the present invention, computer diskette 280 contains computer executable method steps for implementing the method of the present invention. Computer diskette 280 may be considered as a representation of any type of medium that is capable of storing and sending computerized data and instructions.

Figure 3:
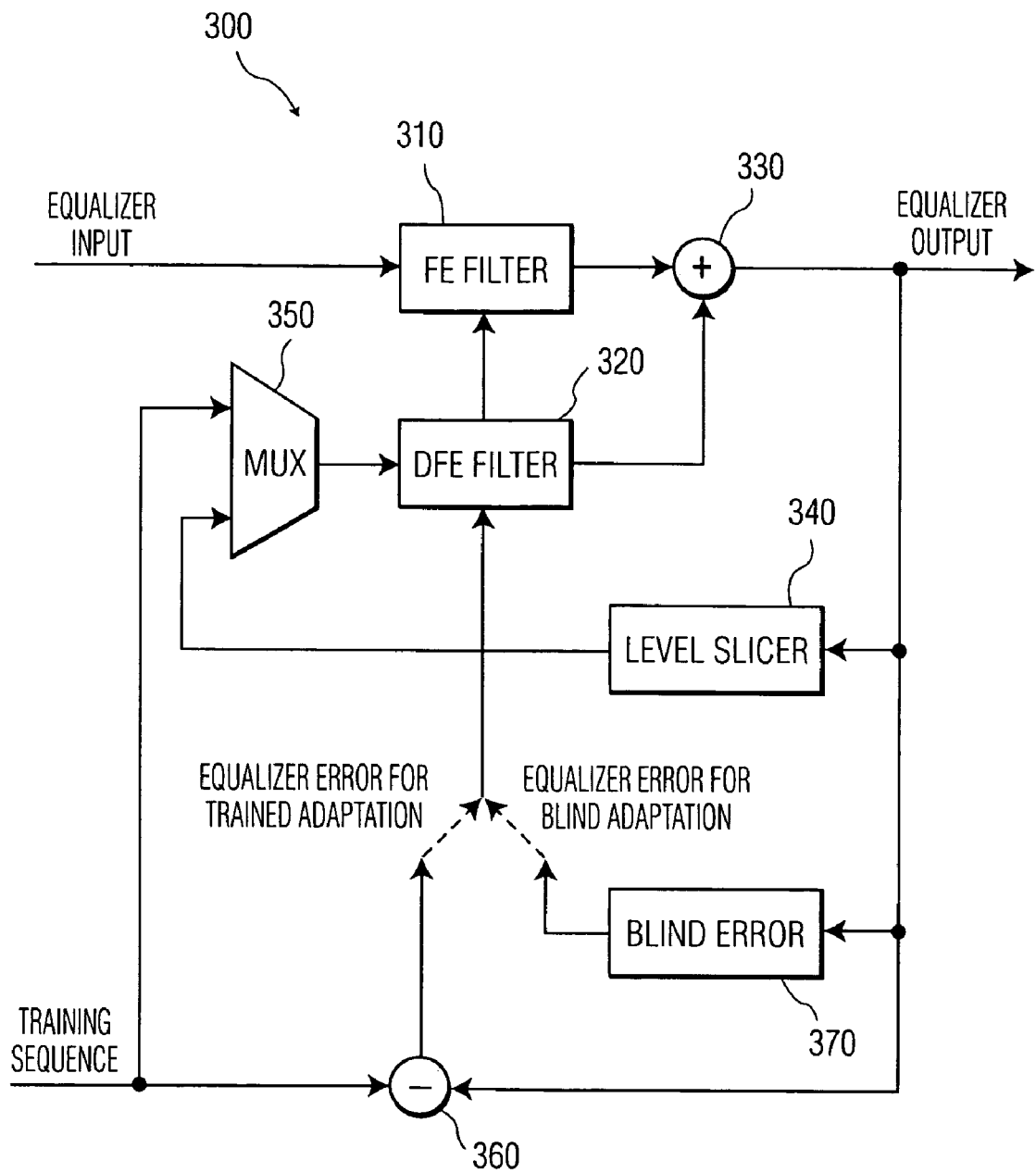
FIG. 3 illustrates a block diagram of a prior art adaptive channel equalizer comprising a forward equalizer (FE) filter and a decision feedback equalizer (DFE) filter.

FIG. 3 illustrates a block diagram of a prior art adaptive channel equalizer 300 for use in equalizer and phase tracker unit 240. Prior art adaptive channel equalizer unit 300 comprises a forward equalizer (FE) filter 310 and a decision feedback equalizer (DFE) filter 320. The output from forward equalizer (FE) filter 310 is added to the output from decision feedback equalizer (DFE) filter 320 in adder unit 330 to form the output of adaptive channel equalizer unit 300.

Forward equalizer (FE) filter 310 accepts the uncompensated channel symbol data as its input. In contrast, decision feedback equalizer (DFE) filter 320 requires for its input an "estimate" of the symbol that was transmitted over the channel before the symbol was corrupted by noise.

As is well known, DFE filter 320 can receive an estimate of the output symbol by simply "slicing" the equalizer output. The term "slicing" refers to the process of taking the allowed symbol value (of the eight (8) levels specified by the 8-VSB ATSC Standard) that is nearest to that of the actual output. In the embodiment shown in FIG. 3, level slicer 340 provides the "sliced" symbols to DFE filter 320 through multiplexer 350. This method of providing estimates of the output symbols to DFE filter 320 can suffer from error propagation caused by slicing errors.

As is also well known, DFE filter 320 can be adapted either in a "trained mode" or in a "blind" mode. In the "trained mode" DFE filter 320 receives a "training sequence" of known symbols (through multiplexer 350) at a certain known time. DFE filter 320 compares the known training sequence with the "equalizer error for trained adaptation." The equalizer error for trained adaptation is obtained by subtracting the equalizer output from the known training sequence. The subtraction process occurs in subtract unit 360. DFE filter 320 then adjusts its operation to cause the equalizer output to match the known training sequence.

Alternatively, DFE filter 320 can operate in a "blind mode." In the "blind mode" DFE filter 320 receives an "equalizer error for blind adaptation" from blind error unit 370. Blind error unit 370 compares the equalizer output with an expected statistical distribution of the data to generate the equalizer error blind adaptation. DFE filter 320 then adjusts its operation to cause the equalizer output to match the expected statistical distribution of the data.

Figure 4:
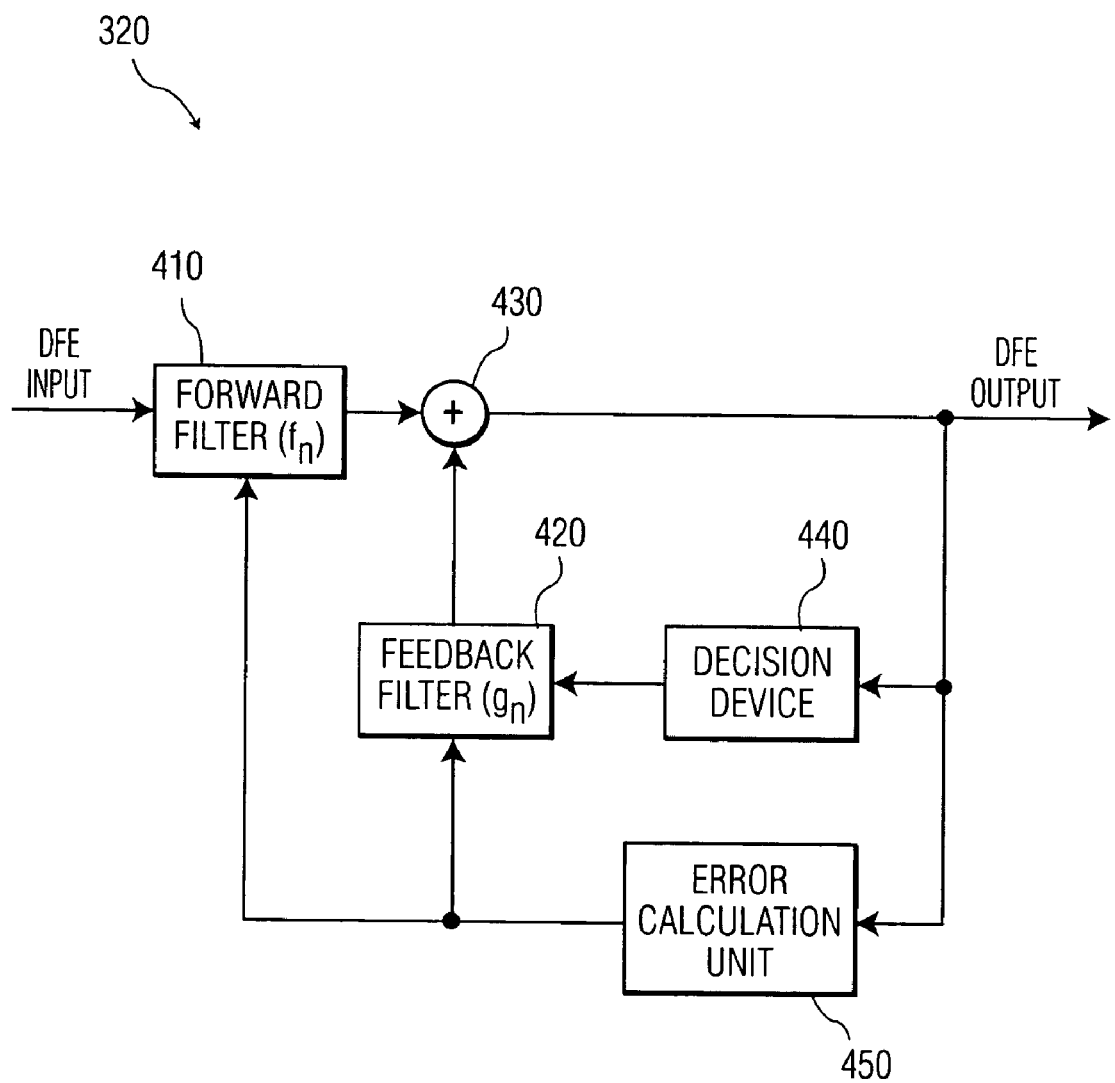
FIG. 4 illustrates a block diagram showing a prior art decision feedback equalizer (DFE) comprising a forward filter, a feedback filter, a decision device, and an error calculation unit.

FIG. 4 illustrates a block diagram showing a prior art decision feedback equalizer (DFE) 320. DFE 320 comprises forward filter 410, feedback filter 420, adder unit 430, decision device 440, and error calculation unit 450. An input signal to DFE 320 is received in forward filter 410. The output from forward filter 410 is added to the output from feedback filter 420 in adder unit 430 to form the output of DFE 320. The output of DFE 320 is fed to decision device 440 and to error calculation unit 450. The output of decision device 440 is fed to feedback filter 420. The output of error calculation unit 450 is fed to forward filter 410 and to feedback filter 420. Information from decision device 440 and error calculation unit 450 is used to reduce errors in feedback filter 420.

Figure 5:
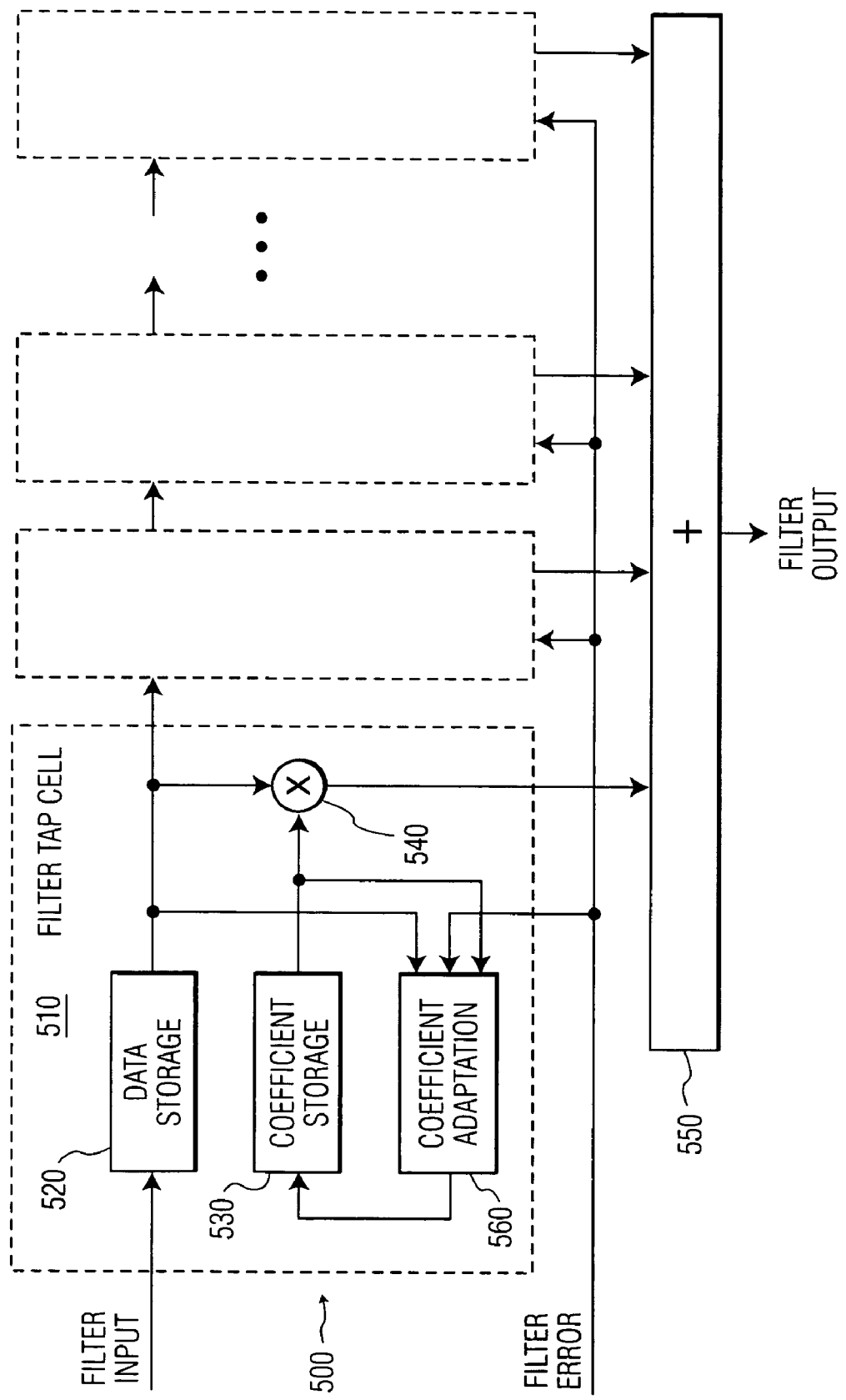
FIG. 5 illustrates a block diagram of an adaptive finite impulse response (FIR) filter for use in feedback filter of a decision feedback equalizer utilizing the principles of the present invention.

FIG. 5 illustrates an adaptive finite impulse response (FIR) filter 500 of the present invention for use in forward filter 410 and for use in feedback filter 420 of decision feedback equalizer 320. The coefficients of FIR filter 500 are computed to compensate 155 as much as possible for channel distortions. The length of FIR filter 500 corresponds to the maximum impairment delay that FIR filter 500 is designed to correct for.

FIR filter 500 comprises a number of filter tap cells 510 (also referred to as "filter taps"). Each filter tap 510 comprises a data storage register 520, a coefficient storage register 530, and multiplier 540. The output of multiplier 540 is input to an adder unit 550. Adder unit 550 sums all of the weighted tap values to generate a filter output. Filter tap 510 also comprises a coefficient adaptation unit 560 that computes the updated filter coefficients. The coefficient adaptation unit 560 has the following inputs: (1) the current coefficient value, (2) the data tap value, and (3) a measure of the equalizer error (i.e., the difference between the expected signal value and the actual output signal value). The calculation of filter coefficients in accordance with the principles of the present invention occurs in coefficient adaptation unit 560. The coefficient adaptation unit 560 operates only when the adaptation process is being performed.

As previously mentioned, a commonly used prior art method of computing the filter coefficients uses the well-known least mean square (LMS) algorithm. The LMS algorithm is a successive approximation technique that uses the current coefficient and data tap values as well as the calculated error to compute a new coefficient value. The LMS algorithm repeats the procedure until each filter tap coefficient converges to the desired optimum value.

The LMS algorithm determines the coefficient vector $$f_n^{k+1}$$

for the forward linear filter of a DFE as follows:

$$f_n^{k+1} = f_n^k + \mu e_k r_{k-n} \quad (1)$$

where $$f_n^k$$

is a forward filter tap coefficient at time k, $\mu$ is an adaptation speed constant, $e_k$ is an error term, and $r_{k-n}$ is a value of the forward filter tap data in the forward filter at time k. The error term $e_k$ is the error calculated from the output of the DFE. The LMS algorithm determines the coefficient vector $$g_n^{k+1}$$

for the feedback filter of the DFE as follows:

$$g_n^{k+1} = g_n^k + \mu e_k a_{k-n} \quad (2)$$

where $$g_n^k$$

is a feedback filter tap coefficient at time k, μ is an adaptation speed constant, $e_k$ is an error term, and $a_{k-n}$ is a value of the feedback filter tap data in the feedback filter at time k.

Equations (1) and (2) leave the coefficients $$f_n^k$$

and $$g_n^k$$

unconstrained. That is, the coefficients $$f_n^k$$

and $$g_n^k$$

can assume any value to reduce multipath interference effects in the DFE. For severe post-echoes and pre-echoes the value of the feedback filter tap coefficients $$g_n^k$$

can grow to such an extent that they reduce the performance of the DFE through error propagation.

The present invention provides and an apparatus and method for constraining the values of the feedback filter tap coefficients $$g_n^k.$$

In the method of the present invention the following equations are used:

$$f_n^{k+1} = f_n^k + \mu e_k r_{k-n} \quad (3)$$

$$g_n^{k+1} = g_n^k + \mu e_k a_{k-n} - \lambda \frac{\partial J}{\partial g_n} \quad (4)$$

where the symbols in Equations (3) and (4) have the same meaning as in Equations (1) and (2) and where the term J is a constraint cost function and where the term λ is a small positive constant factor that is usually less than one.

The constraint function $M(g_n)$ is a function of $g_n$. To properly constrain the values of $g_n$ the value of the constraint function $M(g_n)$ must be less than or equal to zero.

$$M(g_n) \leq 0 \quad (5)$$

If the value of the constraint function $M(g_n)$ becomes larger than zero, then the value of the term $$-\lambda \frac{\partial J}{\partial g_n}$$

in Equation (4) must be adjusted. The constraint cost function J can defined as:

$$J = [M(g_n)]^2 \text{ if } M(g_n) > 0 \quad (6)$$

$$J = 0 \text{ if } M(g_n) \leq 0 \quad (7)$$

For a given constraint cost function J, the gradient of the constraint cost function J with respect to the feedback filter tap coefficients $$g_n^k$$

can be evaluated. The result $$\frac{\partial J}{\partial g_n}$$

is used in Equation (4) to update the feedback filter tap coefficients of feedback filter 420.

In order to demonstrate the benefit of using the method of the present invention, consider a constraint that limits the total energy of the taps. This constraint can be described as:

$$M(g_n) = \sum_{n=0}^{N-1} |g_n|^2 - D \quad (8)$$

where D is a threshold constant (i.e., the total energy of the feedback taps). This constraint means that the total energy of the feedback taps should not exceed a value equal to D.

The value of J for the $M(g_n)$ of Equation (8) is:

$$J = \left[\sum_{n=0}^{N-1} |g_n|^2 - D\right]^2 \text{ if } M(g_n) > 0 \quad (9)$$

$$J = 0 \text{ if } M(g_n) \leq 0 \quad (10)$$

The gradient of the constraint cost function J that is related to the constraint function of Equation (8) is then described as:

$$\frac{\partial J}{\partial g_n} = 4M(g_n)g_n \text{ if } M(g_n) > 0 \qquad (11)$$

$$\frac{\partial J}{\partial g_n} = 0 \text{ if } M(g_n) \leq 0 \qquad (12)$$

As a second example, consider a constraint that limits the magnitude of each tap to the value D. Specifically, $$M(g_n) = |g_n| - D \qquad (13)$$

The value of J for the $M(g_n)$ of Equation (13) is:

$$J = [|g_n| - D]^2 \text{ if } M(g_n) > 0 \qquad (14)$$

$$J = 0 \text{ if } M(g_n) \leq 0 \qquad (15)$$

The gradient of the constraint cost function J that is related to the constraint function of Equation (13) is then described as:

$$\frac{\partial J}{\partial g_n} = 2M(g_n)\text{sign}(g_n) \text{ if } M(g_n) > 0 \qquad (16)$$

$$\frac{\partial J}{\partial g_n} = 0 \text{ if } M(g_n) \leq 0 \qquad (17)$$

The closest approximation to the constraint of Equation (13) may be made by clipping each tap to a value of D. This provides a simple implementation for the constraint of Equation (13).

It is understood that the method of the present invention may also be used to constrain the values of $$f_n^k.$$

That is, the values of $$f_n^k$$

may be obtained from the equation:

$$f_n^{k+1} = f_n^k + \mu e_k r_{k-n} - \lambda \frac{\partial J}{\partial f_n} \qquad (18)$$

where $$f_n^k$$

is a forward filter tap coefficient at time k, μ is an adaptation speed constant, $e_k$ is an error term, and $r_{k-n}$ is a value of the forward filter tap data in the forward filter at time k, J is a constraint cost function, and λ is a small positive constant that is usually less than one.

In an alternate advantageous embodiment of the present invention, the values of both $$f_n^k$$

and $$g_n^k$$

may be constrained simultaneously.

Figure 6:
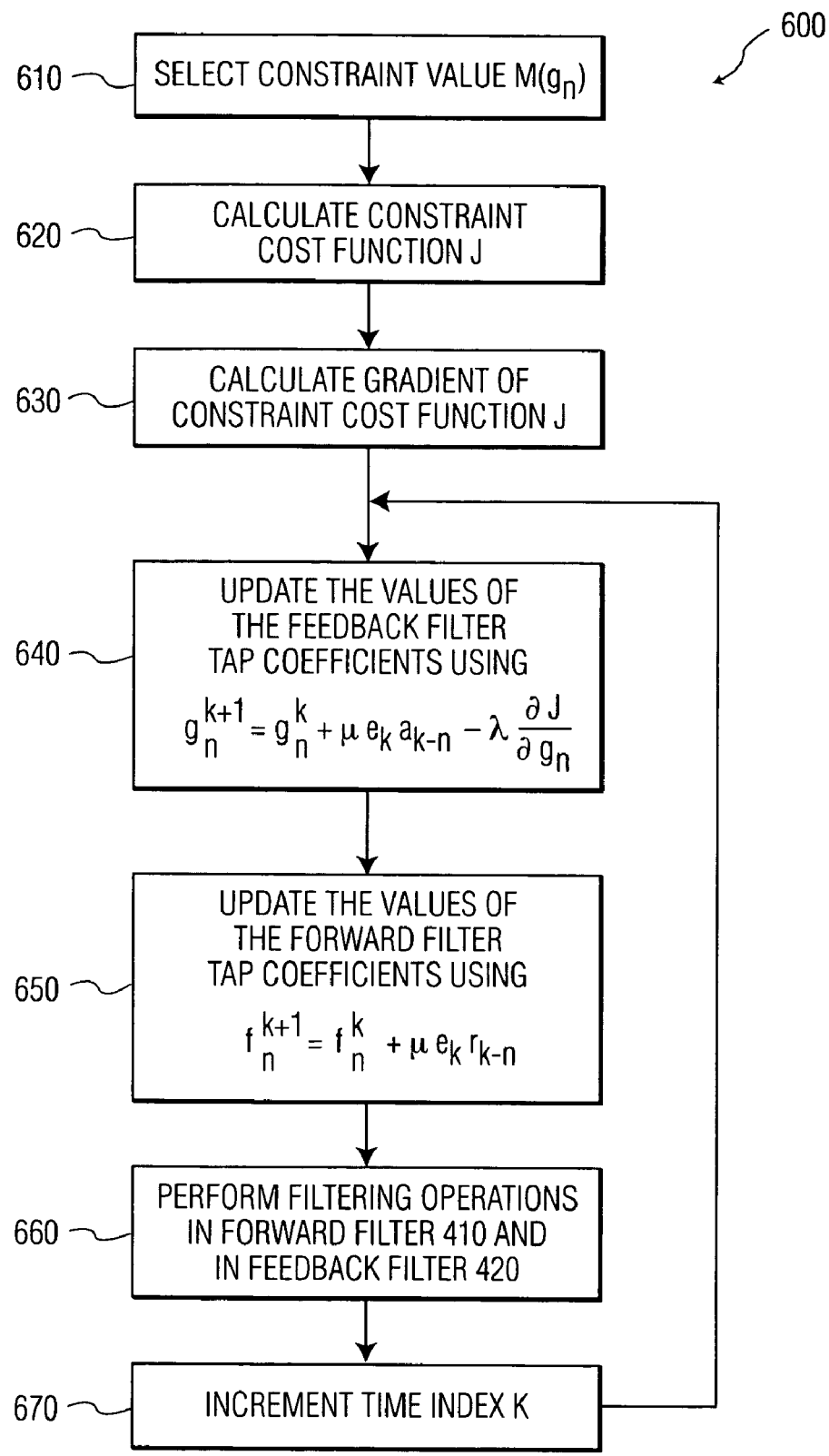
FIG. 6 illustrates a flowchart showing the steps of a method of one advantageous embodiment of the present invention.

FIG. 6 illustrates a flowchart showing the steps of a method of one advantageous embodiment of the present invention. The steps are collectively referred to with reference numeral 600.

First a constraint $M(g_n)$ is selected (step 610). Then the value of the constraint cost function J is calculated using the selected value of the constraint $M(g_n)$ (step 620). Next the value of the gradient of the constraint cost function J with respect to the feedback filter tap coefficients $$g_n^k$$

is calculated (step 630).

Then coefficient adaptation unit 560 within feedback filter 420 uses Equation (4) to update a feedback filter tap coefficient $$g_n^k$$

(step 640). That is, the next feedback filter tap coefficient $$g_n^{k+1}$$

is calculated using:

$$g_n^{k+1} = g_n^k + \mu e_k a_{k-n} - \lambda \frac{\partial J}{\partial g_n} \qquad (4)$$

Then coefficient adaptation unit 560 within forward filter 410 uses Equation (3) to update a forward filter tap coefficient $$f_n^k$$

$$f_n^{k+1}$$

(step 650). That is, the next forward filter tap coefficient is calculated using:

$$f_n^{k+1} = f_n^k + \mu e_k r_{k-n} \qquad (3)$$

In this description step 640 has been described as preceding step 650 for purposes of clarity. In practice step 640 and step 650 may be performed simultaneously. Forward filter 410 and feedback filter 420 then perform their respective filtering operations (step 660). The time index k is then incremented (step 670). Control then returns to step 640 and the method continues to update the filter tap coefficients.

As previously described the presence of the term $$-\lambda \frac{\partial J}{\partial g_n}$$

in Equation (4) constrains the values of the feedback filter tap coefficients $$g_n^k.$$

The constraint provided by the present invention limits the size of the error that circulates in the feedback loop. Error propagation is commensurately limited.

Figure 7:
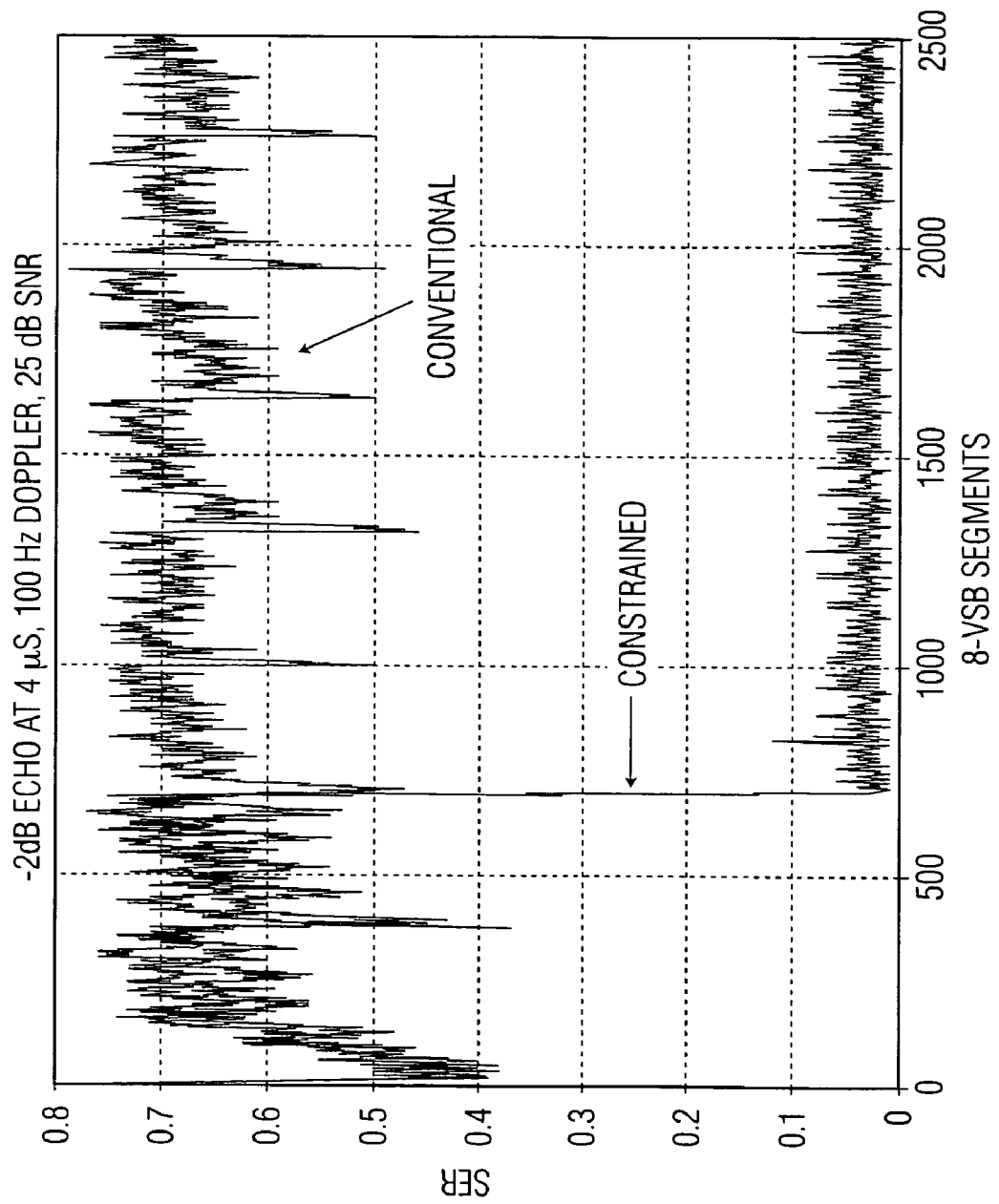
FIG. 7 illustrates a graph showing a symbol error rate curve for a conventional dynamic channel and showing a symbol error rate curve for a dynamic channel in which the values of the feedback filter tap coefficients of a decision feedback equalizer have been constrained in accordance with the principles of the present invention.

FIG. 7 illustrates a graph showing a symbol error rate (SER) curve for a conventional dynamic channel plotted against 8-VSB segments. FIG. 7 also shows a symbol error rate (SER) curve for a dynamic channel plotted against 8-VSB segments in which the values of the feedback filter tap coefficients of a decision feedback equalizer have been constrained in accordance with the principles of the present invention.

The graph shown in FIG. 7 represents results from a simulation of a dynamic channel using an 8-PAM (8-VSB) signal with a channel that has a post echo of negative two decibels (−2 dB) at four microseconds (4 µs) and a twenty five decibel (25 dB) signal to noise ratio (SNR). The decision feedback equalizer contained a forward filter having one hundred twenty eight (128) taps and a feedback filter having one hundred twenty eight (128) taps. The post echo was subject to a doppler frequency of one hundred Hertz (100 Hz). The intended application for the simulation was the Advanced Television Systems Committee Digital Television Standard.

The data plotted in FIG. 7 shows that a decision feedback equalizer using the constrained feedback filter tap coefficients of the present invention correctly tracks a dynamic channel. The data plotted in FIG. 7 also show that a conventional decision feedback equalizer using unconstrained feedback filter tap coefficients is not able to correctly track a dynamic channel. The decision device used in the simulation was a trellis decoder.

It is understood that the present invention may be used in a variety of different decision feedback equalizer circuits. In the exemplary decision feedback equalizer circuit 320 illustrated in FIG. 4, the method of the present invention may be used to calculate the feedback filter tap coefficients $g_n^k$ that are provided to feedback filter 420. It is understood that the equalizer circuit illustrated in FIG. 4 is shown as an example. The method of the present invention is not limited to use only in the equalizer circuit shown in FIG. 4.

While the present invention has been described in detail with respect to certain embodiments thereof, those skilled in the art should understand that they can make various changes, substitutions modifications, alterations, and adaptations in the present invention without departing from the concept and scope of the invention in its broadest form.

What is claimed is:

1. An apparatus for calculating a plurality of feedback filter tap coefficients in a feedback filter of a decision feedback equalizer, wherein said apparatus limits a magnitude of each of the plurality of feedback filter tap coefficients to a total energy of the feedback filter tap coefficients to reduce error propagation in said decision feedback equalizer, and wherein said apparatus calculates each of the plurality of feedback filter tap coefficients using:

$$g_n^{k+1} = g_n^k + \mu e_k a_{k-n} - \lambda \frac{\partial J}{\partial g_n}$$

where $$g_n^k$$

is a feedback filter tap coefficient at time k, µ is an adaptation speed constant, $e_k$ is an error term, $a_{k-n}$ is a value of feedback filter tap data in said feedback filter at time k, J is a constraint cost function, and λ is a small positive constant.

2. The apparatus of claim 1, wherein said cost constraint function J is given by:

$J=M(g_n)^2$ if $M(g_n)>0$ $J=0$ if $M(g_n) \leq 0$ where $M(g_n)$ is a constraint function and where $g_n$ is a feedback filter tap coefficient.

3. The apparatus of claim 2, wherein said constraint function $M(g_n)$ is given by:

$$M(g_n) = \sum_{n=0}^{N-1} |g_n|^2 - D$$

where D is said total energy of said feedback filter tap coefficients.

4. The apparatus of claim 2, wherein said constraint function $M(g_n)$ is given by:

$M(g_n)=|g_n|-D$ where D is said total energy of said feedback filter tap coefficients.

5. The apparatus of claim 1, wherein said apparatus calculates a forward filter tap coefficient for a forward filter using:

$$f_n^{k+1} = f_n^k + \mu e_k r_{k-n} - \lambda \frac{\partial J}{\partial f_n}$$

where $$f_n^k$$

is a forward filter tap coefficient at time k, µ is an adaptation speed constant, $e_k$ is an error term, $r_{k-n}$ is a value of forward filter tap data in said forward filter at time k, J is a constraint cost function, and λ is a small positive constant.

6. A digital receiver system comprising an apparatus for calculating a plurality of feedback filter tap coefficients in a feedback filter of a decision feedback equalizer, wherein said apparatus limits a magnitude of each of the plurality of feedback filter tap coefficients to a total energy of said feedback filter tap coefficients to reduce error propagation in said decision feedback equalizer and wherein said apparatus calculates each of the plurality of feedback filter tap coefficients using:

$$g_n^{k+1} = g_n^k + \mu e_k a_{k-n} - \lambda \frac{\partial J}{\partial g_n}$$

where $$g_n^k$$

is a feedback filter tap coefficient at time k, μ is an adaptation speed constant, $e_k$ is an error term, $a_{k-n}$ is a value of feedback filter tap data in said feedback filter at time k, J is a constraint cost function, and λ is a small positive constant.

7. The digital receiver system of claim 6, wherein said cost constraint function J is given by:

$J=M(g_n)^2$ if $M(g_n)>0$ $J=0$ if $M(g_n)\leq 0$ where $M(g_n)$ is a constraint function and where $g_n$ is a feedback filter tap coefficient.

8. The digital receiver system of claimed 7, wherein said constraint function $M(g_n)$ is given by:

$$M(g_n) = \sum_{n=0}^{N-1} |g_n|^2 - D$$

where D is said total energy of said feedback filter tap coefficients.

9. The digital receiver system of claim 7, wherein said constraint function $M(g_n)$ is given by:

$M(\text{i } g_n)=|g_n|-D$ where D is said total energy of said feedback filter tap coefficients.

10. The digital receiver system of claim 6, wherein said apparatus calculates a forward filter tap coefficient for a forward filter using:

$$f_n^{k+1} = f_n^k + \mu e_k r_{k-n} - \lambda \frac{\partial J}{\partial f_n}$$

where $$f_n^k$$

is a forward filter tap coefficient at time k, μ is an adaptation speed constant, $e_k$ is an error term, $r_{k-n}$ is a value of forward filter tap data in said forward filter at time k, J is a constraint cost function, and λ is a small positive constant.

11. A method for reducing error propagation in a decision feedback equalizer, the method comprising:

calculating a plurality of feedback filter tap coefficient in a feedback filter in said decision feedback equalizer; and limiting a magnitude of each of the plurality of feedback filter tap coefficients to a total energy of the feedback filter tap coefficients, wherein said calculating said feedback filter tap coefficients comprises calculating a feedback filter tap coefficient using:

$$g_n^{k+1} = g_n^k + \mu e_k a_{k-n} - \lambda \frac{\partial J}{\partial g_n}$$

where $$g_n^k$$

is a feedback filter tap coefficient at time k, μ is an adaptation speed constant, $e_k$ is an error term, $a_{k-n}$ is a value of feedback filter tap data in said feedback filter at time k, J is a constraint cost function, and λ is a small positive constant.

12. A method as claimed in claim 11, wherein said cost constraint function J is given by:

$J=M(g_n)^2$ if $M(g_n)>0$ $J=0$ if $M(g_n)\leq 0$ where $M(g_n)$ is a constraint function and where $g_n$ is a feedback filter tap coefficient.

13. A method as claimed in claim 12, wherein said constraint function $M(g_n)$ is given by:

$$M(g_n) = \sum_{n=0}^{N-1} |g_n|^2 - D$$

where D is said total energy of said feedback filter tap coefficients.

14. The method of claim 12, wherein said constraint function $M(g_n)$ is given by:

$M(g_n)=|g_n|-D$ where D is said total energy of said feedback filter tap coefficients.

15. The method of claim 11, further comprising:

calculating a forward filter tap coefficient for a forward filter using:

$$f_n^{k+1} = f_n^k + \mu e_k r_{k-n} - \lambda \frac{\partial J}{\partial f_n}$$

where $$f_n^k$$

is a forward filter tap coefficient at time k, μ is an adaptation speed constant, $e_k$ is an error term, $r_{k-n}$ is a value of forward filter tap data in said forward filter at time k, J is a constraint cost function, and λ is a small positive constant.

16. A computer executable process, stored on a computer readable storage medium, for reducing error propagation in a decision feedback equalizer, the process comprising:

calculating a plurality feedback filter tap coefficient in a feedback filter in said decision feedback equalizer; and limiting a magnitude of each of the plurality of feedback filter tap coefficients to a total energy of the feedback filter tap coefficients, wherein said calculating said feedback filter tap coefficients comprises calculating a feedback filter tap coefficient using:

$$g_n^{k+1} = g_n^k + \mu e_k a_{k-n} - \lambda \frac{\partial J}{\partial g_n}$$

where $$g_n^k$$

is a feedback filter tap coefficient at time k, μ is an adaptation speed constant, $e_k$ is an error term, $a_{k-n}$ is a value of feedback filter tap data in said feedback filter at time k, J is a constraint cost function, and λ is a small positive constant.

17. The computer executable process of claim 16, wherein said cost constraint function J is given by:

$$J = M(g_n)^2 \text{ if } M(g_n) > 0$$

$$J = 0 \text{ if } M(g_n) \leq 0$$

where $M(g_n)$ is a constraint function and where $g_n$ is a feedback filter tap coefficient.

18. The computer executable process of claim 17, wherein said constraint function $M(g_n)$ is given by:

$$M(g_n) = \sum_{n=0}^{N-1} |g_n|^2 - D$$

where D is said total energy of said feedback filter tap coefficient.

19. The computer executable process of claim 17, wherein said constraint function $M(g_n)$ is given by:

$$M(g_n) = |g_n| - D$$

where D is said total energy of said feedback filter tap coefficients.

20. The computer executable process of claim 16, further comprising:

calculating a forward filter tap coefficient for a forward filter using:

$$f_n^{k+1} = f_n^k + \mu e_k r_{k-n} - \lambda \frac{\partial J}{\partial f_n}$$

where $$f_n^k$$

is a forward filter tap coefficient at time k, μ is an adaptation speed constant, $e_k$ is an error term, $r_{k-n}$ is a value of forward filter tap data in said forward filter at time k, J is a constraint cost function, and λ is a small positive constant.

* * * * *